(12) United States Patent
Girotto et al.

(10) Patent No.: US 12,142,997 B2
(45) Date of Patent: Nov. 12, 2024

(54) ELECTRIC MOTOR WITH HEATSINK

(71) Applicant: TEXA DYNAMICS S.R.L., Monastier di Treviso (IT)

(72) Inventors: Adriano Girotto, Monastier di Treviso (IT); Bruno Vianello, Monastier di Treviso (IT)

(73) Assignee: TEXA DYNAMICS S.R.L., Monastier di Treviso (IT)

( * ) Notice: Subject to any disclaimer, the term of this patent is extended or adjusted under 35 U.S.C. 154(b) by 272 days.

(21) Appl. No.: 17/633,244

(22) PCT Filed: Aug. 5, 2020

(86) PCT No.: PCT/IB2020/057380
§ 371 (c)(1),
(2) Date: Feb. 7, 2022

(87) PCT Pub. No.: WO2021/024190
PCT Pub. Date: Feb. 11, 2021

(65) Prior Publication Data
US 2022/0286021 A1    Sep. 8, 2022

(30) Foreign Application Priority Data
Aug. 7, 2019    (IT) ............... 102019000014334

(51) Int. Cl.
*H02K 9/22*    (2006.01)
*H02K 1/16*    (2006.01)

(52) U.S. Cl.
CPC ............. *H02K 9/227* (2021.01); *H02K 1/165* (2013.01)

(58) Field of Classification Search
CPC ............ H02K 1/16; H02K 1/165; H02K 9/22; H02K 9/227
USPC ......................................... 310/52, 54, 64, 89
See application file for complete search history.

(56) References Cited

U.S. PATENT DOCUMENTS

| | | | |
|---|---|---|---|
| 2008/0193275 A1* | 8/2008 | De Filippis | H02K 1/30 310/43 |
| 2011/0309726 A1* | 12/2011 | Carpenter | H02K 21/24 310/75 R |
| 2013/0127271 A1 | 5/2013 | Defilippis | |
| 2013/0270948 A1* | 10/2013 | Unterfrauner | H02K 9/223 310/114 |
| 2015/0288241 A1 | 10/2015 | Mahler | |
| 2016/0226330 A1* | 8/2016 | Li | H02K 11/33 |
| 2017/0279337 A1* | 9/2017 | Komura | H02K 5/18 |
| 2020/0350800 A1* | 11/2020 | Hurry | H02K 5/207 |
| 2021/0265885 A1* | 8/2021 | Takahashi | H02K 21/22 |
| 2021/0367494 A1* | 11/2021 | Takahashi | H02K 1/2788 |
| 2021/0384802 A1* | 12/2021 | Tamura | H02K 3/28 |
| 2022/0077738 A1* | 3/2022 | Takahashi | H02K 9/223 |

(Continued)

Primary Examiner — Rashad H Johnson
(74) Attorney, Agent, or Firm — Rivka Friedman

(57) ABSTRACT

An electric motor (MC) is described comprising
a rotor (100) rotatable about a rotation axis (X),
a stator comprising
  a circular series of windings for creating a magnetic field through which to rotate the rotor;
  a support provided with a circular series of seats for housing the windings;
an element (40, 50), mounted between a winding and a wall of the respective seat which houses it, configured to conduct heat from the winding towards the outside of the stator in order to dissipate the heat.

15 Claims, 2 Drawing Sheets

(56) References Cited

U.S. PATENT DOCUMENTS

Figure 1:
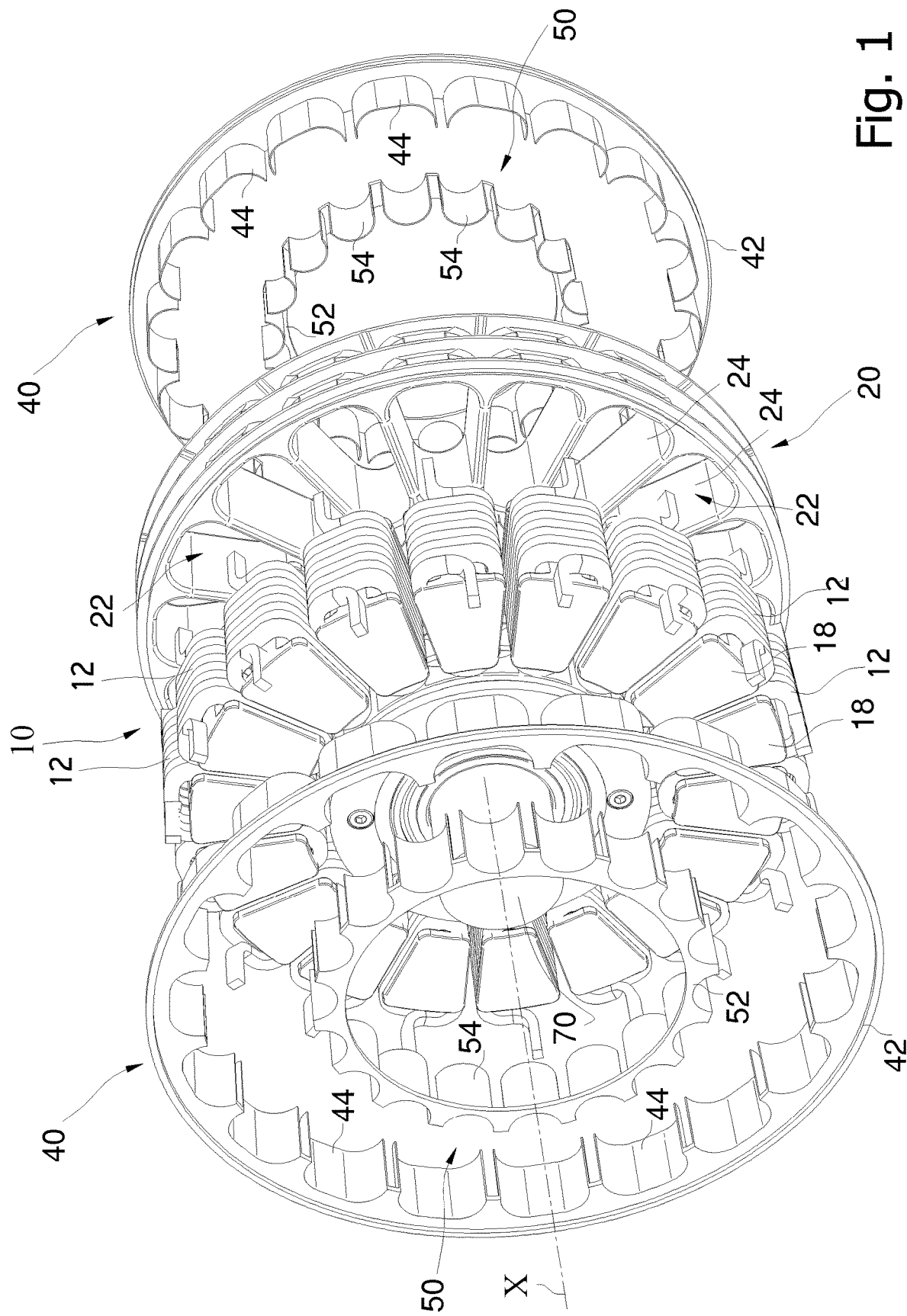

| | | | |
|---|---|---|---|
| 2022/0140715 A1* | 5/2022 | Mawatari | H02K 21/22 |
| | | | 310/152 |
| 2022/0200386 A1* | 6/2022 | El Baraka | H02K 9/227 |
| 2022/0224208 A1* | 7/2022 | Tomita | H02K 5/225 |
| 2023/0038386 A1* | 2/2023 | Goykhman | H02K 9/197 |
| 2023/0216376 A1* | 7/2023 | Sakuragi | H02K 9/06 |
| | | | 310/60 R |

* cited by examiner

ELECTRIC MOTOR WITH HEATSINK

The present invention relates to a heatsink for an electric motor, especially an axial flux electric motor. The invention also refers to the motor equipped with the heat extraction and disposal system and to an electric vehicle mounting the motor.

Electric vehicles, especially high-performance ones, are equipped with very powerful electric motors. As such, they dissipate a lot of heat, which must be disposed of. E.g. high-power vehicles have electric motors with power ratings of hundreds of KW, hence the primary need to cool them.

Usually two cooling systems are used: the oil bath and the peripheral water circuit. In the oil bath, borrowed from the technology of transformers, the motor coils are immersed in oil, which then exchanges heat with a separate water circuit. The peripheral water circuit is constituted of a loop run by water that develops around the motor.

The major drawback of the oil bath is the lower heat capacity with respect to water. The major defect of the peripheral water circuit is the low invasiveness of water, which circulates far from the coils to be cooled.

The main object of the invention is to improve the present state of the art.

The object is achieved by what is reported in the attached claims; advantageous technical characteristics are defined in the dependent claims.

An electric motor is proposed comprising:
a rotor rotatable about a rotation axis,
a stator comprising
    a circular series of windings for creating a magnetic field through which to rotate the rotor, preferably the polar axis of the magnetic field is parallel to the rotation axis;
    a support equipped with a circular series of seats for housing the windings;
    an element, mounted between a winding and a wall of the respective seat which houses it, configured to conduct heat from the winding towards the outside of the stator in order to dissipate the heat.

In particular, the invention is preferably directed to an axial-flux electric motor, i.e. a motor having a stator with a circular series of windings, arranged about the rotor's rotation axis, which generate a magnetic flux with polar axis parallel to the rotor's rotation axis.

This type of motor has a more complex structure than radial-flux motors but is lighter and smaller the power being the same.

An advantage of the aforementioned motor is that it implements a better cooling, because the heat extraction takes place at a point (the external area of the windings) which is not only very thermally stressed but generally inaccessible to known cooling systems.

According to a preferred embodiment, said element is metallic, e.g. made of Al, Cu, Au or Ag.

According to a preferred embodiment, said element comprises a plurality of concave plates extending along directions parallel to each other, each plate being configured to be inserted into an empty space between a winding and a wall of the respective seat which houses it for removing heat from this empty space.

Thus the heat can be dissipated towards the outside of the stator.

According to a more preferred embodiment, said element comprises a ring and the plurality of concave plates extend from the ring orthogonally to an imaginary plane in which the ring lies. The ring allows grouping integrally together the plates, it is easy to assemble and it is thin.

According to a preferred embodiment, a or each plate has a substantially constant cross-section along said direction of extension (or along a direction orthogonal to said imaginary plane).

Preferably the substantially constant cross-section of a or each plate is an arcuate segment.

According to a preferred embodiment, said plurality of concave plates is equal in number to the number of seats for the windings.

According to a preferred embodiment, the plurality of concave plates, which extend from the ring when present, have concavities that are all radially facing towards the rotation axis or are all facing a radial direction opposite to the rotation axis.

According to a preferred embodiment, the motor comprises on one side of the stator two elements as defined above, wherein
    the ring of the first element is placed concentrically with and coplanar to the ring of the second element,
    the ring of the first element has a greater radius than the ring of the second element,
    the plates of the first element have concavities which are all radially facing the rotation axis, and
    the plates of the second element have concavities which are all radially facing a direction opposite to the rotation axis.

Another aspect of the invention refers to an electric vehicle which mounts the motor, e.g. a car, a truck, a lorry, or a ship. In these cases the motor has a non-negligible power and/or significant stresses, therefore the advantages of the invention are particularly significant.

Another aspect of the invention refers to a method for cooling an electric motor,
    the electric motor comprising:
    a rotor rotatable about a rotation axis,
    a stator comprising
        a circular series of windings for creating a magnetic field to rotate the rotor,
        preferably the polar axis of the magnetic field is parallel to the rotation axis;
        a support equipped with a circular series of seats to house the windings;
    with the step of cooling a winding towards the outside of the stator by removing heat, preferably by thermal conduction, from a point located between a winding and a wall of the respective seat that houses it.

A variant of the method envisages for cooling a winding by mounting at said point a heat conducting element which extends from said point towards the outside of the stator.

Figure 4:
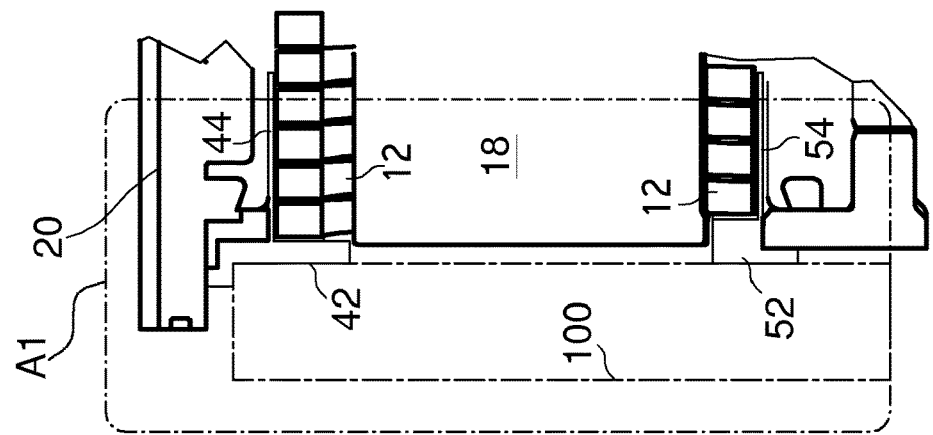
Figure 3:
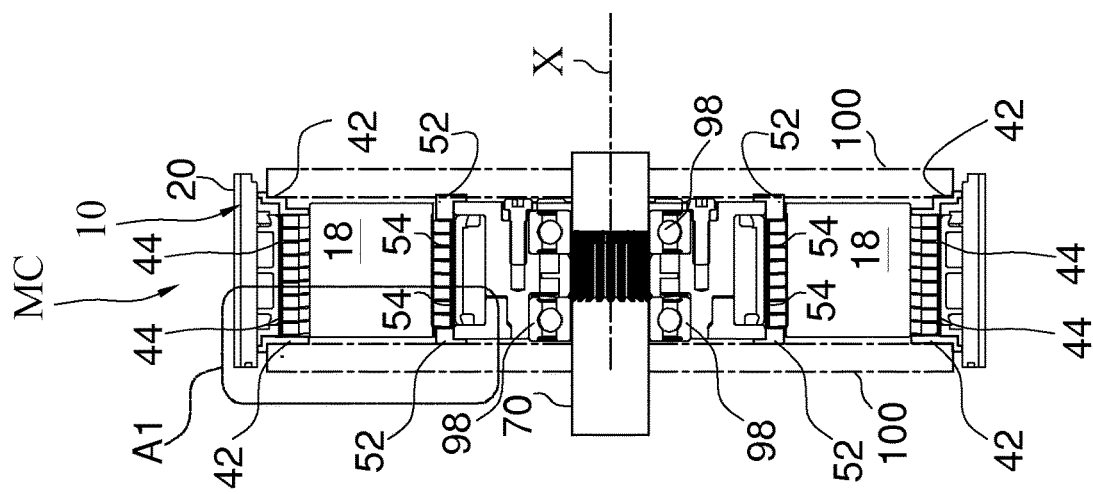
Figure 2:
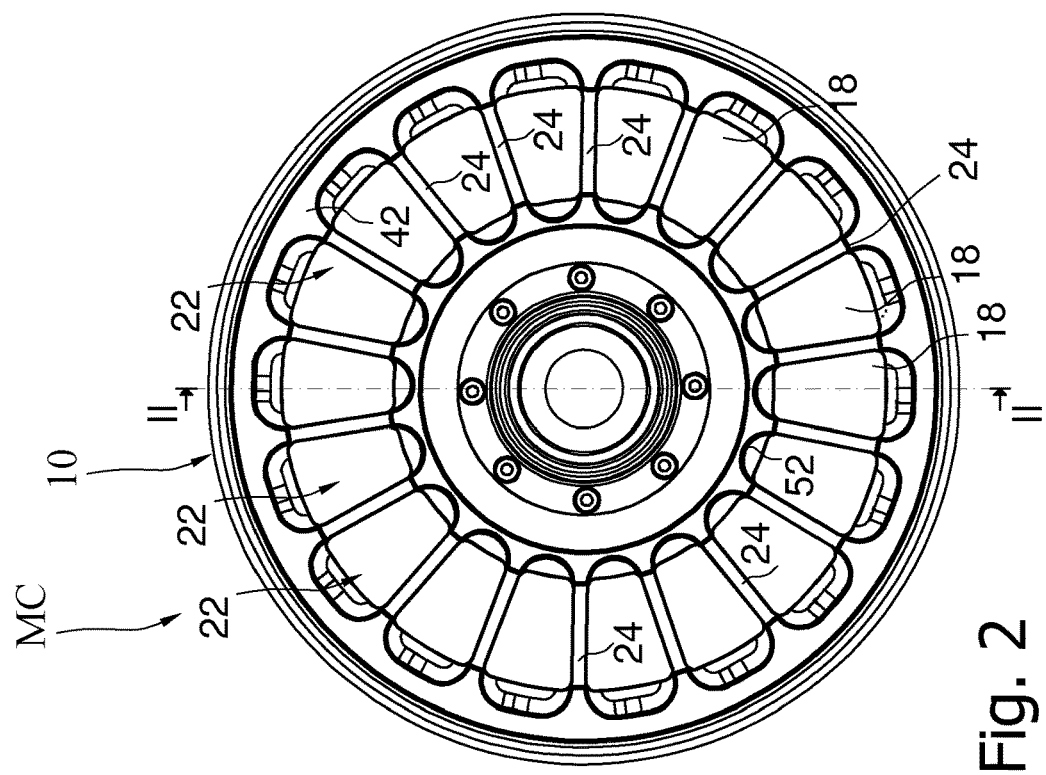

Further advantages will become clear from the following description, which refers to a preferred embodiment of a motor in which:

FIG. 1 shows an exploded view of an electric motor;
FIG. 2 shows a front view of the motor;
FIG. 3 shows a cross-sectional view of the motor according to the II-II plane;
FIG. 4 shows an enlargement of the area μl in FIG. 3.

Same numbers in the figures indicate equal or substantially equal parts. In order not to crowd the drawings, the elements are not all numbered.

FIG. 1 illustrates an electric motor MC which comprises a shaft 70 integral to a rotor 100 (shown in broken lines), both rotatable about an axis X.

The MC motor has polar symmetry around the X axis.

The shaft 70 coaxially crosses a stator 10 with which it is coupled through bearings 98 placed between the stator 10 and the shaft 70.

The stator 10 comprises a disc 20 comprising, around the X axis, a series of radial spokes 24 which delimit a circular series of pass-through openings 22 in which respective electric windings 12 are housed, containing a ferromagnetic core 18, which in use generate magnetic fields which rotate the rotor 100.

To dissipate the heat developed by the windings 12, the MC motor comprises four heatsink elements, that is, two pairs for each side of the stator 10.

Each pair of heatsink elements comprises an external heat sink element 40, of larger diameter, which is concentric and coplanar to an internal heatsink element 50 of smaller diameter.

Each heatsink element 40, 50 is formed respectively by a substantially flat ring 42, 52, a sort of frame, from which there extends, in the same half-plane and parallel to the X axis, a circular series of curve plates 44, 54.

The curved plates 54 have a concavity facing the X axis, while the curved plates 44 have a concavity facing an opposite direction orthogonal to the X axis. Therefore two facing plates 44, 54 have concavities that are facing each other.

On the elements 40, 50 there is an equal number of curved plates 44, 54, and such number is equal to the number of windings 12 and openings 22. Also, the external plates 54 are proportionally larger than the internal plates 44. Even if the above-mentioned configuration ensures maximum heat dissipation, the number and/or arrangement of the curved plates 44, 54 may be different from what is illustrated.

The curved plates 44 of the element 40 are complementary to an empty space present between the windings 12 and the radially outermost perimeter of the openings 22, while the curved plates 54 of the element 50 are complementary to an empty space present between the windings 12 and the radially innermost perimeter (closest to the X axis) of the openings 22.

The element 40 is mounted so that the ring 42 rests on one side of the stator 10 and the curved plates 44 end up between the windings 12 and the radially outermost perimeter of the openings 22. In turn, the element 50 is mounted so that the ring 52 rests on the same side of the stator 10 and the curved plates 54 end up between the windings 12 and the radially innermost perimeter of the openings 22.

The opposite side of the stator 10 is equipped in the same way.

The plates 44, 54 collect the heat generated by the windings 12 and transfer it towards the outside of the rotor 12 to the rings 42, 52, which, remaining on the surface of the sides of the rotor 12, can dissipate the heat into the air and/or pass it to the adjacent rotor and/or to a circuit of cooling fluid (not shown).

The elements 40, 50 then act as a kind of equivalent finning for the windings 12.

As a variant, a different number of dissipating elements may be used, e.g. only one pair or only one for each side of the stator.

The invention claimed is:

1. An electric motor comprising:
   a rotor rotatable about a rotation axis,
   a stator comprising
   a circular series of windings for creating a magnetic flux with polar axis parallel to the rotation axis through which to rotate the rotor,
   a support provided with a circular series of seats for housing the windings;
   an element, mounted between a winding and a wall of the respective seat which houses it, configured to conduct heat from the winding towards the outside of the stator in order to dissipate the heat.

2. The electric motor according to claim 1, wherein said element is metallic.

3. An electric motor according to claim 2, wherein said element is made of Al, Cu, Au or Ag.

4. The electric motor according to claim 1, wherein said element comprises a plurality of concave plates which extend along directions parallel to each other, each plate being configured to be inserted in an empty space between a winding and a wall of the respective seat which houses it to remove heat from said empty space.

5. The electric motor according to claim 4, wherein said element comprises a ring and the plurality of concave plates extend from the ring orthogonally to an imaginary plane in which the ring lies.

6. The electric motor according to claim 5, comprising on one side of the stator two elements as defined above, wherein
   the ring of the first element is placed concentrically with and coplanar to the ring of the second element,
   the ring of the first element has a greater radius than the ring of the second element,
   the plates of the first element have concavities which are all radially facing the rotation axis, and
   the plates of the second element have concavities which are all radially facing a direction opposite to the rotation axis.

7. The electric motor according to claim 4, wherein a or each plate has a substantially constant cross-section along said direction of extension.

8. An electric motor according to claim 7, wherein the substantially constant cross-section of a or each plate is an arcuate segment.

9. The electric motor according to claim 4, wherein the plurality of concave plates have concavities which are all radially facing the rotation axis or are all facing a radial direction opposite to the rotation axis.

10. An electric motor according to claim 4, wherein said plurality of concave plates is equal in number to the number of seats for the windings.

11. An electric vehicle which mounts a motor according to claim 1.

12. A method for cooling an electric motor, the electric motor comprising:
    a rotor rotatable about a rotation axis,
    a stator comprising
    a circular series of windings, to create a magnetic flux with polar axis parallel to the rotation axis, to rotate the rotor;
    a support provided with a circular series of seats for housing the windings;
    with the step of cooling a winding towards the outside of the stator by removing heat from a point between a winding and a wall of the respective seat that houses it.

13. The method according to claim 12, wherein a winding is cooled by mounting at said point a heat-conducting element which extends from said point towards the outside of the stator.

14. The method according to claim 12, wherein said element is metallic.

15. An electric motor according to claim 14, wherein said element is made of Al, Cu, Au or Ag.

\* \* \* \* \*